United States Patent

Mori

[11] Patent Number: 4,662,714
[45] Date of Patent: May 5, 1987

[54] INTEGRATED CONSTRUCTION OF A LARGE NUMBER OF OPTICAL CONDUCTOR CABLES

[76] Inventor: Kei Mori, 3-16-3-501, Kaminoge, Setagaya-ku, Tokyo, Japan

[21] Appl. No.: 663,021

[22] Filed: Oct. 19, 1984

[30] Foreign Application Priority Data

Oct. 28, 1983 [JP] Japan .................. 58-203212
Aug. 8, 1984 [JP] Japan .................. 59-166080

[51] Int. Cl.⁴ .......................... G02B 6/36; G02B 7/26
[52] U.S. Cl. .................. 350/96.20; 350/96.24
[58] Field of Search .......... 350/96.20, 96.22, 96.24, 350/96.25, 96.26, 96.27

[56] References Cited

U.S. PATENT DOCUMENTS

| | | | |
|---|---|---|---|
| 4,092,059 | 5/1978 | Hawkes et al. | 350/96.24 |
| 4,547,668 | 10/1985 | Tsikos | 350/96.25 |
| 4,569,571 | 2/1986 | Reidinger | 350/96.27 |
| 4,576,147 | 3/1986 | Hashiguchi | 350/96.26 |
| 4,603,942 | 8/1986 | Chang et al. | 350/96.24 |
| 4,611,886 | 9/1986 | Cline et al. | 350/96.20 |

Primary Examiner—William L. Sikes
Assistant Examiner—Robert E. Wise
Attorney, Agent, or Firm—Jordan and Hamburg

[57] ABSTRACT

A large number of optical conductor cables are integrated and connected to a single optical conducting rod for use in transmitting light energy to a distant place through the optical conducting rod. The integrated construction is comprised of a large number of optical conductor cables and a large number of optical fibers, the bundle of which is unbound at one end of each optical conductor cable. A cladding layer of each optical fiber being cut off and the edge surface thereof being arranged on the same plane and then unitarily bound thereon by the use of an adhesive or the like. The bound portion of each optical fiber being approximately in the shape of a head-cut circular cone, and each optical fiber being approximately parallel with each other at a place near to the edge surface thereof.

9 Claims, 6 Drawing Figures

INTEGRATED CONSTRUCTION OF A LARGE NUMBER OF OPTICAL CONDUCTOR CABLES

BACKGROUND OF THE INVENTION

The present invention relates to a light energy concentrating device preferable for use in transmitting light energy to a distant place, namely an integrated construction of a large number of optical conductor cables, and a connected construction of a large number of optical fibers and an optical conductor rod.

The present applicant has previously proposed various methods and apparatuses in which solar rays are focused by a lens or the like and guided into an optical conductor cable and those solar rays are transmitted through it onto an optional desired place for use in illumination or for other purposes.

In order to realize such a technical feat as described above i.e. the optical conductor cable being used for transmitting solar rays focused by a lens, onto a desired place, if quartz glass of the smallest light attenuation constant is used as the optical conductor cable, it will make the cost for producing it very high and thereby discourage potential users from purchasing it. proposed various methods and apparatuses in which solar rays are focused by a lens or the like and guided into an optical fiber and those solar rays are then transmitted through the optical conductor rod onto an optional desired place for use in illumination or for other purposes.

A large number of lenses of approximately 4 cm in diameter are used therein. Solar rays focused by each lens are guided into an optical fiber, the light-receiving edge of which is positioned at the focal point of the respective lenses. Light rays passing through a large number of the optical fibers are completely guided into a single optical conductor rod and then transmitted through the optical conductor rod onto an optional desired place.

However, in such a case, there exists no adequate means for connecting a large number of optical fibers with a single optical conductor rod.

SUMMARY OF THE INVENTION

It is an object of the present invention to provide an integrated construction in which a large number of optical conductor cables are integrated so as to allow those cables to be connected with a single optical conductor rod.

It is another object of the present invention to provide a connecting member capable of effectively connecting a large number of optical fibers with a single optical conductor rod.

In the present invention, a high concentration of light energy is guided into the optical conductor rod and it is then transmitted to a distant place through the optical conductor rod. As a result the amount of quartz glass used can be decreased so that the production costs ae greatly lowered.

DESCRIPTION OF THE PREFERRED EMBODIMENTS

Figure 1:
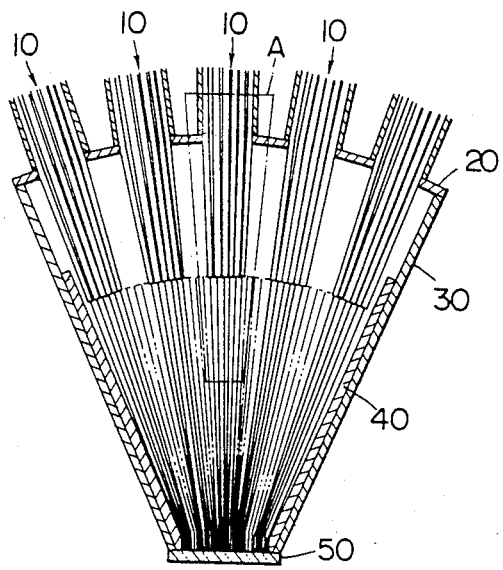
FIG. 1 is a cross-sectional side view for explaining an embodiment of the manufacturing process of the integrated construction according to the present invention.
Figure 2:
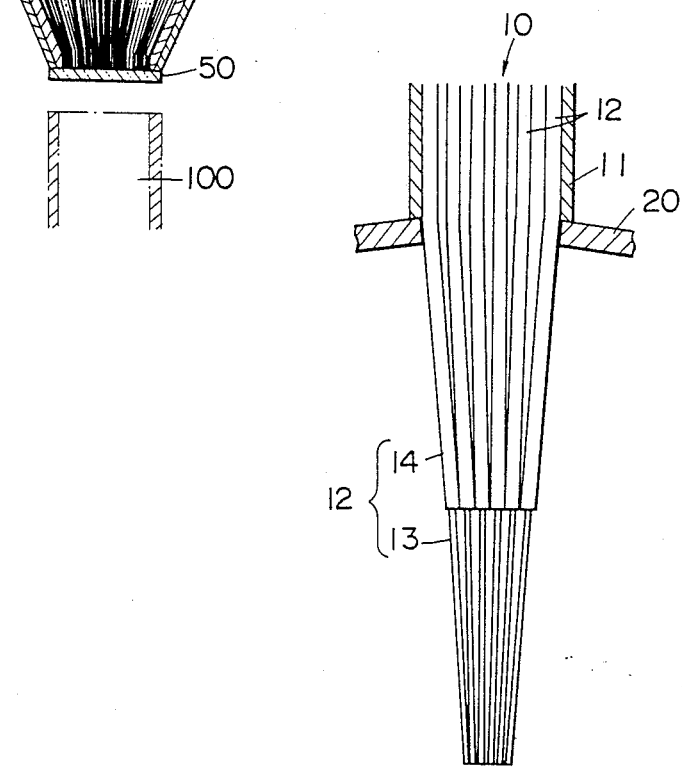
FIG. 2 is a partially enlarged cross-sectional view of the portion shown by an area A in FIG. 1.

FIG. 1 is a cross-sectional view showing the embodiment of an integrated construction of an optical conductor cable according to the present invention. In FIG. 1, 10 is an optical conductor cable for transmitting light energy, 20 is a supporting frame for supporting each of the optical conductor cables 10 maintaining a desired positional relation between them, 30 is a hollow head-cut conical frame, 40 is a cladding member unitarily provided on the inner wall at the head-cut portion of the hollow circular cone, and 50 is a quartz glass plate. A large number of holes are bored in the supporting frame 20 at a predetermined distance, and as shown in FIG. 2 the optical conductor cables are inserted through each of the holes.

As is well known, each optical conductor cable 10 is comprised of a large number of optical fibers 12 and those optical conductor fibers are unitarily bundled by means of an outer housing 11. The core 13 of each optical fiber 12 is covered by a cladding 14. The outer housing 11 of each optical conductor cable is cut off to a length previously calculated in accordance with the size of the hole into which it is to be inserted. Only the optical fiber portion 12 is inserted into the hole and the outer housing 11 is used for affixing the optical conductor cable 10 to the supporting frame 20.

Figure 3:
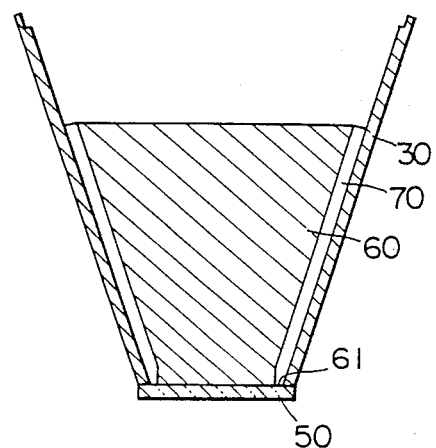
FIGS. 3, 4, and 5 are cross-sectional views for explaining an embodiment of the method for manufacturing the integrated construction according to the present invention.
Figure 4:
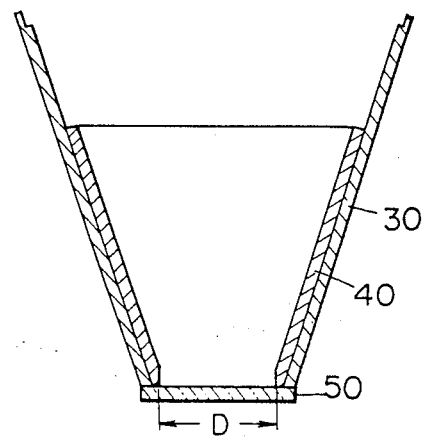
Figure 5:
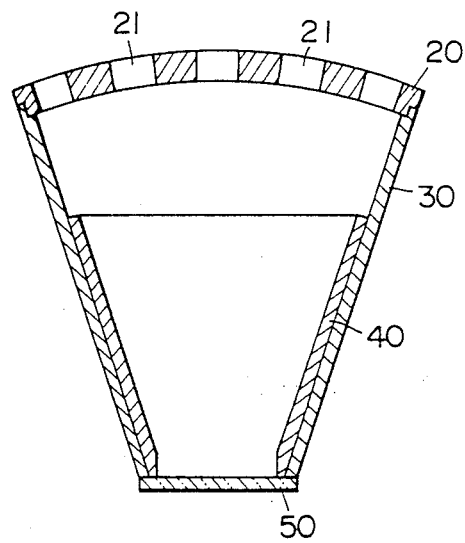

FIGS. 3 through 5 are cross-sectional views for explaining an embodiment of the manufacturing process for the integrated construction of the optical conductor cable. In those figures, the same reference numberal as in FIGS. 1 and 2 is attached to the member performing the same action.

Furthermore, in FIG. 3, 50 is a transparent plate temporarily affixed to the small-diameter edge-opening portion of the frame 30, for instance, a quartz glass plate, and 60 is a head-cut, circular cone temporarily installed in the frame 30, on a temporary plate 50, and is concentric with the frame 30. The edge portion 61 of the head-cut circular cone 60 is formed in the shape of a cylinder.

The head-cut circular cone 60 is smaller than the frame 30, and when it is installed in the frame 30, as mentioned before, a gap-space 70 results, appearing between the inner wall of the frame 30 and the outer wall of the head-cut circular cone 60. A liquid cladding material is poured into the gap-space 70. After the material becomes hardened, the head-cut circular cone 60 is removed from the frame 30 so that a cladding layer 40 is formed on the inner wall of the small-diameter edge-opening portion of the frame 30 as shown in FIG. 4. Afterward, the supporting frame 20 is fixedly mounted on the large-diameter rear edge-opening portion of the frame 30 as shown in FIG. 5. Holes 21 of a number equal to the optical conductor cables 10 are bored into the supporting frame 20. The respective optical conductor cables 10 are inserted through the respective holes 21 into the inner space of the frame 30 as shown in FIGS. 1 and 2.

More definitely, the present applicant has previously proposed a solar ray collecting device in which nineteen lenses were employed for focusing solar rays and whose light-receiving edge is positioned at the focal point of each lens. When using such a solar ray collecting device, the number of optical conductor cables is nineteen. Consequently, the number of the holes 21 has to be nineteen also.

The inner diameter D of the frame's 30 edge portion is determined by the number of optical fibers, the diameter of the core etc. On the other hand, the number of the holes in the supporting frame 20 and their diameter are determined by the number of optical conductor cables and their diameter. In consideration of those conditions, the distance between the quartz glass plate 50 and the supporting frame 20 is roughly determined and, as a consequence, the distance between the location of each hole and the quartz glass plate is also predetermined. The dimensions of the supporting frame 20 are determined on the basis of the calculations mentioned above. The supporting frame 20 and the quartz glass plate 50 are installed on the frame 30, at a predetermined distance from each other.

In the case of the integrated construction, a predetermined amount of optical paste, capable of being hardened by ultraviolet rays, as an example, is put on the quartz glass plate 50. Next, the outer housing of each optical conductor cable is partially cut off to a length corresponding to the location of the holes through which the respective optical conductor cables are inserted. Then after cutting off the cladding layer of each optical fiber (preferably, by cutting off the cladding layer of each optical fiber so as to position the core portion 13 without the cladding layer 14 in the area of the cladding layer 40 of the frame 30), each optical fiber is inserted through the holes into the frame 30. As a result, the edge of each optical fiber's core portion comes into contact with the quartz glass plate 50, and it may be possible to confirm with the naked eye through the quartz glass plate 50 whether the edge of the core portion comes into contact with the quartz glass plate 50.

In such a manner, all of the optical conductor cables are inserted through the holes of the supporting frame 20 into the inner space of the frame 30. After bringing the edges of all optical fibers into contact with the quartz glass plate 50, ultraviolet rays are concentrated thereon through the optical fiber so that the optical paste is hardened.

As a result, each optical conductor cable 10 is fixed in a predetermined position by means of the supporting frame 20; the core portions of the respective optical fibers are unitarily integrated by the use of optical paste; and the edge surface of the core portion thereof is bound on the quartz glass plate 50 by an adhesive. In such a manner, an integrated construction of the optical conductor cables is completed.

When the edge surface i.e. the quartz glass surface of the integrated construction is assembled as mentioned heretofore, it is connected with the edge surface of the optical conductor rod 100 by directly bringing the one into contact with the other. The light energy, transmitted through a large number of optical conductor cables, can be concentrated and guided into the optical conductor rod 100. Then it can be further transmitted through the optical conductor rod 100 onto an optional desired place. In such a case the amount of quartz glass needed is relatively small so that the manufacturing costs can be greatly decreased.

In addition to the above-mentioned merits, the assembly work may become quite easy because only one optical conductor rod (a single rod) instead of a large number of optical conductor cables would be used. Furthermore, according to the present invention, the edge surface portions of the integrated optical conductor cables i.e. the edge surface portions of the respective optical conductor cables are integrated approximately in parallel with the surface of the optical conductor rod opposed thereto. Consequently, the light rays emitted from the respective optical fibers can be effectively transmitted to the optical conductor rod 100.

An integrated construction unitarily having the frame 30, the quartz glass plate 50, etc., is described heretofore. However in some cases, it may be possible to use such an integrated construction from which the quartz glass plate 50 is removed after integrating the optical conductor cables, the frame, the quartz glass plate etc. Furthermore, it may be also possible to use the integrated construction, from which the frame 30 is removed (or from which both of the quartz glass plate and the frame are removed) after integrating the elements as mentioned above.

As is apparent from the foregoing description, according to the present invention, a large number of optical conductor cables are effectively integrated and the light energy transmitted through each optical conductor cable is effectively guided into a single optical conductor rod, and further the light energy is transmitted through the optical conductor rod onto an optional desired place. As a result, the amount of quartz needed in the construction is small so that the manufacturing cost of the optical conductor cable assembly can be largely decreased. In such a case, the assembly work becomes very easy because only one optical conductor rod (a single rod) is required. These are thought to be the chief merits of the present invention.

Figure 6:
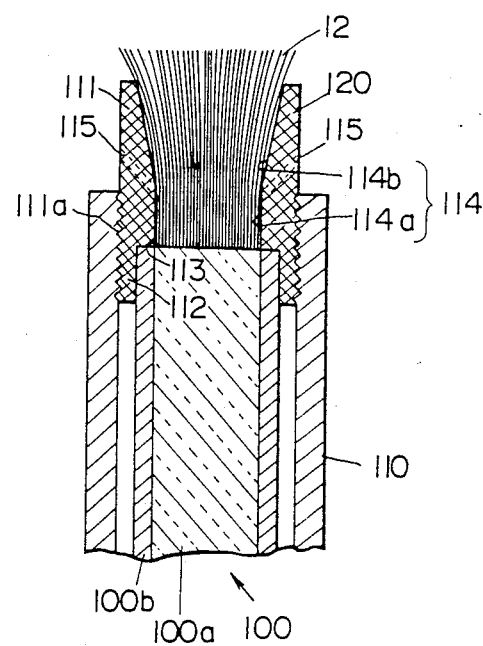
FIG. 6 is a cross-sectional side view for explaining another embodiment of the present invention.

FIG. 6 is a cross-sectional view for explaining another embodiment of the present invention. In FIG. 6, 12 are optical fibers, 100 is an optical conductor rod consisting of a core portion 100a and a cladding layer 100b, 110 is a protection tube for protecting the optical conductor rod 100, and 120 is a connecting member.

The light-receiving edge portion (not shown in FIG. 6) of each optical fiber 12 is positioned at the focal point of the solar ray focusing lens or connected to an optical conductor cable and the solar rays, focused by each lens or transmitted through the optical conductor cable, are guided into the optical fiber and transmitted through it.

In such a manner, the solar rays transmitted through the optical fiber 12 are guided through the connecting member 120 into the optical conductor rod 100 and are further transmitted through the optical conductor rod 100 onto an optional desired place for use in illumination or for other purposes.

The connecting member 120 is employed for bringing together a large number of optical fibers 12 with a single optical conductor rod 100. The connecting member 120 is comprised of an external circumferential surface 111 having a screw portion 111a engaged with the internal circumferential surface of the protecting tube 110, an elongated portion 112 that is elongated in the gap-space between the optical conductor rod 100 and the protecting tube 110, a shoulder portion 113 oppositely brought into contact with the cladding layer 100b on the inner side of the elongated portion 112, and a tubular portion having an internal circumferential surface 114 consisting of a uniform diameter portion 114a, from the shoulder portion to the half way thereof, and an enlarging portion 114b with the inner diameter increasing gradually i.e. in a tapering fashion.

When a connection is performed, the connecting member 120 is engaged with the protecting tube 110 as shown in FIG. 6, and afterward the optical fibers 12 are forcedly inserted in order into the connecting member 120 after cutting off the cladding layer at the edge portion thereof. However, since the internal circumferential surface 114b of the connecting member 120 is formed in a tapering fashion, it may be possible to forcedly insert the optical fiber into the connecting member 120 even though the cladding layer of the optical fiber is not cut off. It follows that the largest number of optical fibers possible can be forcedly inserted into the connecting member.

After forcedly inserting a large number of optical fibers into the connecting member 120 in such a manner, adhesive is injected into the optical fiber portion from above or through holes 115 bored in the side wall of the connecting member 120, or after the connecting member is thus situated an adhesive in a gel state, having an adhesive characteristic after the lapse of a predetermined time-span, is injected into it. In such a manner, a large number of optical fibers and an optical rod are connected forcibly by the adhesive and the light rays from the optical fibers can be effectively guided into the optical conductor rod.

In the foregoing description, only the transmission of light rays from a large number of optical fibers into a single optical conductor rod is explained. It may be possible to divert and transmit the light rays from the single optical conductor rod into a large number of optical fibers. In such a case the optical fibers for diverting the light rays can be used in combination with others of different diameters.

As is apparent from the foregoing description, according to the present invention, a large number of optical fibers can be effectively connected with single optical conductor rod by means of a simple and low-cost construction.

What is claimed is:

1. An integrated construction for a plurality of optical conductor cables comprising a plurality of conductor cables for transmitting light energy, each of said cables comprising a plurality of optical conductor fibers each having one longitudinal end disposed in a common plane, each of said cables further comprising an outer housing, said outer housing extending to a position spaced from said one longitudinal end of said fibers to thereby define an end portion of said fibers free of said outer housing, said fibers having an outer cladding layer, said cladding layer, extending to a location spaced from said one longitudinal end of said fibers to thereby define an end section of said fibers free of said cladding layer, a supporting member having a plurality of openings through which parts of said fibers extend, a hollow conical frame joined to said supporting member and into which said fiber parts are disposed, a cladding means on the inner surface of said conical frame, a quartz glass plate mounted on said frame, said one longitudinal end of each fibers contacting said plate, and adhesive means bonding said optical fibers to each other and to said glass plate.

2. An integral construction according to claim 1 wherein said conical frame has a large diameter end and a small diameter end, said supporting member being mounted at said large diameter end, said glass plate being mounted on said small diameter end.

3. An integrated construction according to claim 2 wherein said conical frame has an inner cylindrical wall part of uniform diameter formed at said smaller diameter end and extending from said glass plate.

4. An integrated construction according to claim 1 further comprising fixing means fixing the longitudinal ends of said outer housing of said cables to said supporting member.

5. An integrated construction according to claim 1 wherein said outer cladding layers on said fibers extend partially into said conical frame.

6. An integrated construction according to claim 1 wherein said cladding means extends from said glass plate to a position spaced from said supporting member.

7. A connecting device for connecting an optical conductor rod to a plurality of fibers, comprising a conductor rod having a core and a cladding layer, a protection tube disposed about and spaced from said cladding layer, a connecting member having an outer wall and an inner wall, said connecting member having a longitudinal end portion, external thread means on said outer wall at said longitudinal end portion, said protection tube having a longitudinal end section with internal thread means, said longitudinal end portions of said member extending into the space between the protection tube and the cladding layer as said internal thread means engages said external thread means, said members having an internal shoulder at said longitudinal end portion extending from said inner wall said shoulder being in contact with a longitudinal end of said cladding layer, said inner wall having a first inner wall part extending from said shoulder and which engages an outer longitudinal end section of said cladding layer, said inner wall having a second inner wall part extending from said shoulder and a third inner wall part extending from said second inner wall part, said second inner wall part having a cylindrical configuration of uniform diameter, said third inner wall part having a conical configuration, said plurality of fibers being disposed within said conical member at said second and third inner wall parts.

8. A connecting device according to claim 7 further comprising adhesive means adhesively joining said plurality of fibers and the longitudinal end of said core of said conductor rod.

9. A connecting device according to claim 8 further comprising hole means in said member for injecting said adhesive means into said member.

* * * * *